Jan. 16, 1968  H. C. SONDEREGGER  3,364,368
PIEZO-ELECTRIC TRANSDUCER
Filed Nov. 17, 1964  4 Sheets-Sheet 1

INVENTOR
Hans Conrad Sonderegger
BY Dicke & Craig
ATTORNEYS

Jan. 16, 1968  H. C. SONDEREGGER  3,364,368
PIEZO-ELECTRIC TRANSDUCER

Filed Nov. 17, 1964                                    4 Sheets-Sheet 3

INVENTOR
Hans Conrad Sonderegger
Dicke & Craig
BY
ATTORNEY

Jan. 16, 1968     H. C. SONDEREGGER     3,364,368

PIEZO-ELECTRIC TRANSDUCER

Filed Nov. 17, 1964     4 Sheets-Sheet 4

INVENTOR
Hans Conrad Sonderegger
Dicke & Craig

BY

ATTORNEY

United States Patent Office 3,364,368
Patented Jan. 16, 1968

3,364,368
PIEZO-ELECTRIC TRANSDUCER
Hans Conrad Sonderegger, Winterthur, Switzerland, assignor to Messrs. Kistler Instrumente A.G., Winterthur, Switzerland
Filed Nov. 17, 1964, Ser. No. 411,756
9 Claims. (Cl. 310—8.7)

The invention relates to a piezo-electric transducer with a crystal arrangement located inside a tubular spring under axial precompression and resting at one of its ends against one end of the tubular spring and at the other of its ends against the surface of an abutment.

In one of the known transducers of this kind the abutment for the crystal arrangement is pressed into the tubular spring. Such an arrangement is disadvantageous in that not only a special working operation is required for pressing in the abutment but also the obtainable prestressing or precompression is subjected to considerable variations, because the slightest displacements of the abutment result in considerable changes of pressure.

In other known transducers the abutment and the tubular spring are screwed together. The use of such a screwing again requires expensive working operations for manufacturing the threads and for screwing the abutment into the casings. Furthermore, the provision of screwings also sets limits for miniature constructions of transducers. A special disadvantage, however, is that the pressure which is exerted on the crystal arrangement by the screwed abutment evades a direct measuring so that also in this case the maintenance of a definite precompression is not guaranteed.

Screwed transducers, moreover, have the disadvantage, that a vacuum tight construction of the transducer is considerably difficult. Lack of tightness of the transducer can lead to the crystal arrangement absorbing moisture and a loss of the necessary high insulation. Also non-fluid-tight transducers cannot be used in spaces which are under vacuum or come into cotnact with radio active media. It is true that under some circumstances by using seals of synthetic materials or other materials initial fluid-tightness can be ensured; such materials age however comparatively rapidly thereby impairing considerably the fluid-tightness of the transducer. This is especially true if the transducer is subjected to high temperatures.

The invention permits these difficulties to be avoided in a surprisingly simple manner. The invention is characterized in that the crystal arrangement rests directly against a stationary surface of the transducer casing receiving the tubular spring and that the tubular spring is provided with a welding flange which is welded under prestressing directly to the transducer casing.

An advantage of the invention is that during the welding process the required precompression may be imposed to the crystal arrangement and that this compression is fully retained after termination of the welding process. It is, therefore, possible to exactly adjust the desired compression. Thereby no special and expensive working operations are required but the compression can be adjusted in the welding process. The connection of the transducer casing with the tubular spring by welding ensures a very reliable, well defined and absolutely tight seal. Thus the invention makes it possible to produce a piezo-electric transducer in a very simple and inexpensive manner which offers at the same time the possibility to give the crystal arrangement the desired precompression with high precision and to hermetically seal the transducer.

According to a further feature of the invention it is considered to provide the flange of the tubular spring with a welding ridge the height of which is so determined that after the welding process the crystal arrangement shows the desired precompression. In this way it is especially simple to produce the required precompression and an especially perfect welding is guaranteed. In a preferred embodiment of the invention a free space is provided between the tubular spring and the transducer casing, said space serving for the introduction of the welding electrode. Furthermore the transducer casing is provided with a shoulder surface standing transversely to the axis of the tubular spring and serving as an abutment of a second welding electrode which acts as counter-electrode when welding the tubular spring to the casing. These measures make it possible to construct the welding arrangement very simple and it is ensured that the forces are transmitted perfectly to those parts of the transducer to be welded.

In order to tighten the space between the tubular spring and the transducer casing against the surroundings it is a further feature of the invention to seal this space by a diaphragm, which is connected with both the tubular spring and the transducer casing by welding. Such diaphragms between the tubular spring and the transducer casing are known, however in the known transducers the diaphragms are in general constructed in one part with the tubular spring and joined with the casing at their periphery by bending. Such constructions have several disadvantages. They particularly interfere with the above described construction of the transducer. In known constructions of transducers the crystal arrangement consisting of one or more individual crystal elements is supported on the one hand fixedly in the transducer casing and on the other hand against a pressure plunger which is in fitting engagement with a diaphragm operated by the measuring pressure; the peripheral part of the diaphragm is joined with the casing by crimping.

Known constructions of this kind leave two aims open. On the one hand substantial masses are present between the crystal arrangement and the diaphragm which acts to give an undesirable reduction in the natural frequency of the transducer system and often makes it basically impossible to effect the measurement of pressure vibrations even of comparatively low frequency. On the other hand such known transducers, especially when using crimped diaphragm edges, are seldom completely fluid-tight or quickly lose their initial tightness in operation. The result is an entry of moisture to the crystals which are extremely sensitive as regards lowering of their necessarily high insulation properties. To this it should be added that non-fluid-tight sources cannot be used under vacuum or in the presence of radio-active media.

All these disadvantages are eliminated by the construction of the transducer according to the invention with a welded diaphragm. In order to facilitate the welding of the diaphragm further features of the invention show a crystal arrangement disposed within the tubular spring and defining a central free space which is followed coaxially by a free space surrounded by the casing. The diaphragm then can be welded with the bottom of the tubular spring by means of a welding electrode applied to the bottom of the tubular spring and passed through the free space in the casing and through the free space surrounded by the crystal arrangement and by a further welding electrode pressed from the outside on the diaphragm.

It is especially convenient to connect the diaphragm and the tubular spring by a ring ridge welding since by this kind of welding a particularly satisfactory and entirely tight connection is ensured. After welding the diaphragm to the bottom of the tubular spring the periphery of the diaphragm can be connected with the ring-shaped front surface of the transducer casing also by a ring ridge welding.

In order to prevent the crystal assembly from being damaged by splashing of the welding material the invention provides a ceramic ring between the piezo-electric crystal arrangement and the casing, which at the same time serves as insulator. In an especially preferred embodiment of the invention the piezo-electric crystal arrangement is disposed between such ceramic distance rings, which at the same time makes it possible to choose the lengths and co-efficients of expansion so, that the total assembly has the same co-efficient of expansion as the surrounding tubular spring, so that changes in temperature do not influence the compression of the crystal assembly.

The invention and further features associated therewith are further explained hereinafter on the basis of the embodiments shown in the accompanying drawing, wherein.

Figure 3:
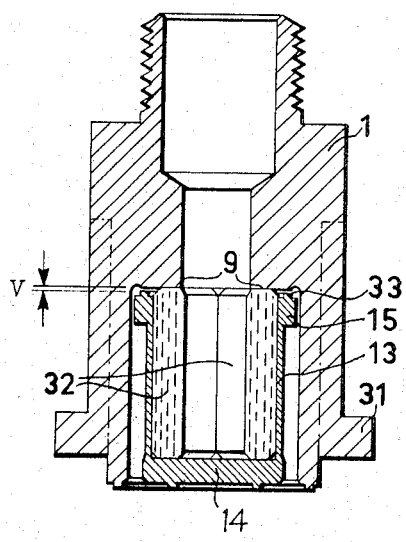
Figure 5:
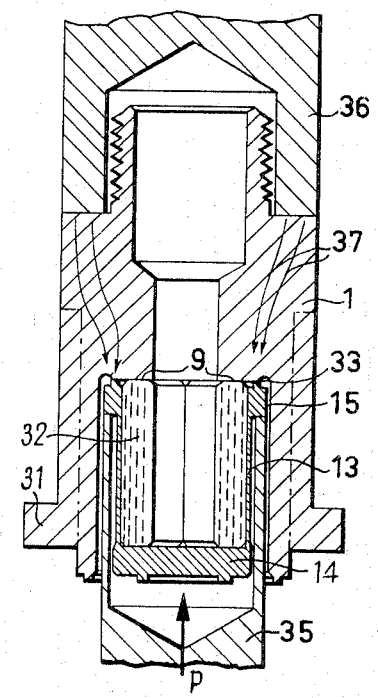
Figure 4:
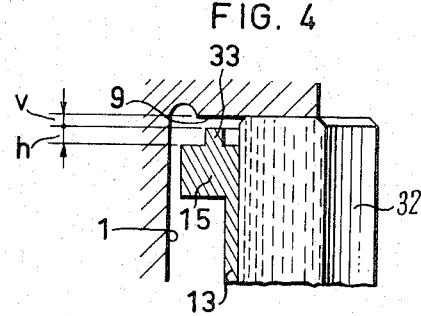
Figure 6:
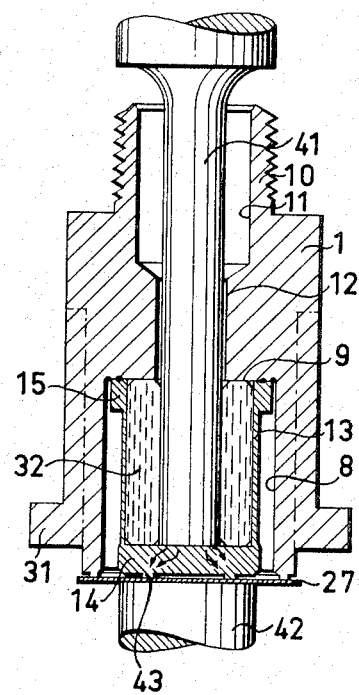
Figure 7:
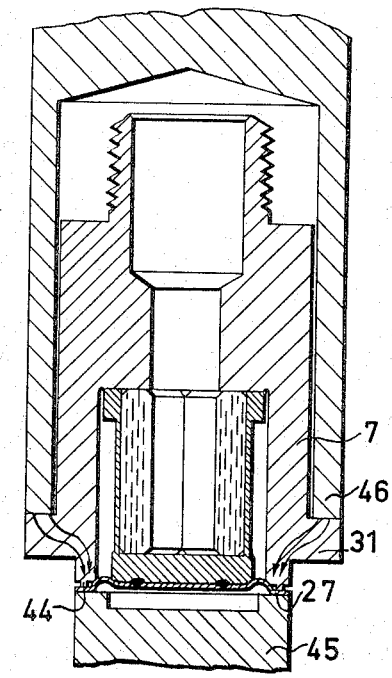
Figure 8:
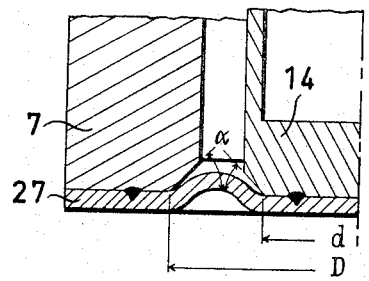
Figure 9:
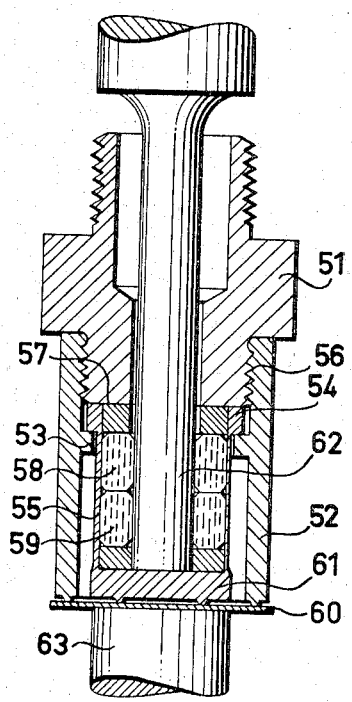

FIG. 3 shows a longitudinal section through the casing of a transducer ready for welding-in the tube spring, FIG. 4 shows in section a detail of the arrangement shown in FIG. 3, FIG. 5 shows the arrangement according to FIG. 3 with an applied welding electrode, FIG. 6 shows in section the transducer prepared ready for welding the diaphragm to the bottom of the tubular spring, with inserted welding electrodes, FIG. 7 shows the welding of the edge part of the diaphragm to the casing, FIG. 8 shows in detail the edge part of a finished welded-in diaphragm, and FIG. 9 shows another embodiment of a transducer with a two-part casing.

Figure 1:
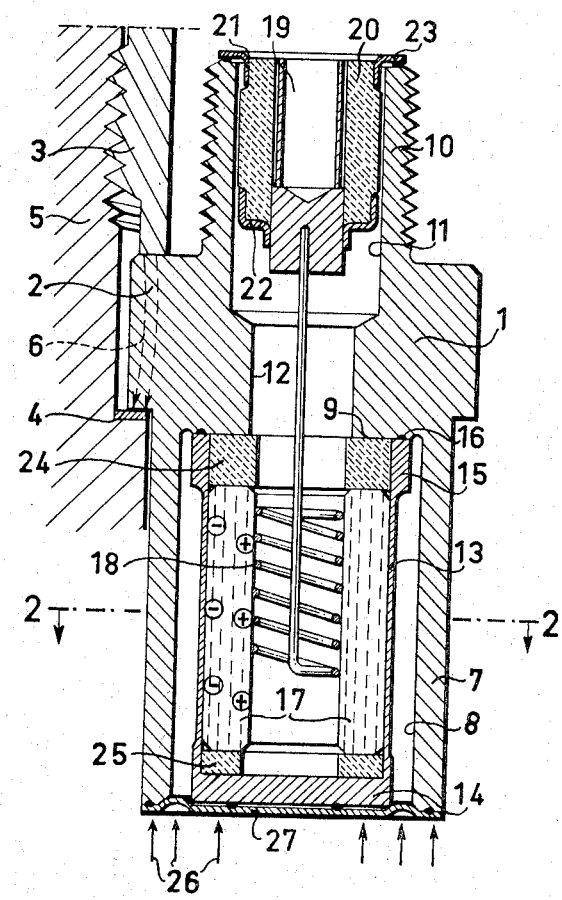
FIG. 1 shows a longitudinal section through the finished assembled transducer.

The transducer shown in FIG. 1 comprises a casing 1 produced from steel and provided with a holding flange 2. In the assembled state of the transducer, the flange 2 is pressed against the seal 4 by means of a nipple 3, which rests against a shoulder-like seating in the wall 5. This arrangement provides a very short path for the clamping forces; in particular this path indicated by the arrow 6 is located outside of the parts serving for the transmission of the measuring forces, which substantially increases the accuracy of the transducer signal.

The casing 1 embodies a lower part 7 the inner wall 8 of which merges into an accurately worked surface 9 standing perpendicularly to the longitudinal axis. The upper part 10 of the casing 1 comprises a bore 11 which extends through an opening 12 with the internal space of the lower part of the casing surrounded by the wall 8.

The lower part 7 of the casing serves for receiving the piezo-electric crystal assembly. This comprises a very thin-walled tube spring 13 which has a wall thickness of about one or only several mils and forms together with the bottom part 14 serving as a pressure plunger, a chamber for receiving the crystal arrangement. At the open end of this chamber the tubular spring embodies a rib-like projection 15 which serves as a welding ring for welding the tube spring 13 and the casing surface 9 by means of a ring ridge welding 16.

Figure 2:
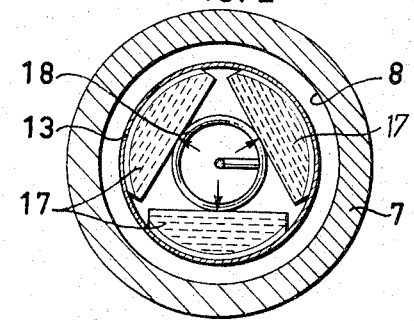
FIG. 2 shows a cross-section on the line 2—2 in FIG. 1.

The crystal arrangement located within the tubular spring consists of three individual crystal elements 17 of quartz which embody, as shown in FIG. 2, a cross-section substantially of the form of a section of a circle. The transverse piezo-effect is used wherein the positive electric charges are taken, by means of a contact spring 18 constructed as a wire spiral, from the flat inner crystal surfaces provided with an evaporated metal plating. The negative charges are led off from the outer surfaces of the crystal elements directly through the tubular spring 13 to the casing 1. The positive charges pass through the central conductor of the contact spring 18 into the sleeve 19 serving for receiving a plug, not shown. This sleeve is mounted in the ceramic insulator 20 inserted in part 10 of the casing and is hard soldered by its end parts into metal mountings 21 or 22. The top metal mounting 21 is constructed as a welding flange and is welded completely tight on assembly of the transducer in a final operation preferably under vacuum or in a rare gas atmosphere, by ring ridge welding 23 with the casing part 10.

To compensate the various co-efficients of expansion as well as for protecting the crystals against excessive temperature peaks, when using the transducer under high temperatures, two ceramic rings 24 and 25 with quite definite co-efficients of expansion are provided. A diaphragm 27 serving for transmitting the measuring pressure represented by the arrow 26 is welded to the bottom 14 of the tubular spring which bottom serves as pressure plunger, likewise by ring ridge welding. The peripheral edge of the diaphragm is welded in the same way to the part 7 of the casing and is provided between the bottom 14 and the part 7 with a depression directed towards the inside of the transducer.

FIG. 3 shows the casing 1 of the transducer prepared for welding-in the tubular spring 13. The casing embodies a flange 31 at its lower part 7 which is later removed by turning down the casing at the chain dot line. In contrast to the arrangement according to FIGS. 1 and 2 the crystal chamber formed by the tubular spring 13 and the bottom 14 embodies a two-part hollow cylindrical quartz crystal arrangement 32. For reasons of simplicity the rings 24 and 25 of FIG. 1 are not shown; they may be actually omitted under some circumstances.

The welding ring 15 is provided with the welding ridge 33 on its end facing the surface 9, the dimensions of this ridge are conveniently chosen by experiment. Since the crystal arrangement is assembled under precompression, the welding ridge 33 is spaced by an amount $v$ from the surface 9 when the crystal arrangement abuts against the said surface. FIG. 4 shows these parts on a larger scale.

In order to produce the welding connection between the ring 15 and the casing 1 an electrical welding electrode 35 is used as shown in FIG. 5 which is constructed in the manner of a plunger and rests over the whole periphery on the shoulder part of the ring 15 facing it. The casing 1 rests on the fixed counter electrode 36. The force P exerted by the movable electrode 35 expands the tubular spring 13 so far that the welding ridge 33 bears under compression against the surface 9 of the casing 1. On starting the welding current impulse the welding ridge is compressed and the ring 15 welded firmly to the casing. The path of the welding current through the casing 1 is indicated by the arrow 37.

On application of the welding current pulse the welding ridge 33 is virtually flattened so that the tubular spring is prestressed further by the amount of the welding ridge height $h$ additionally to the distance $v$. The pressure force P of the electrode 35 must, therefore, be at least sufficiently great that it is able to stretch the tubular spring by this total expansion. The finished welding produces an absolutely tight closure of the crystal chamber against the diaphragm part of the transducer.

During the further assembly of the transducer the diaphragm 27 is welded to the bottom 14 of the crystal chamber conveniently, as shown in FIG. 6, by means of two welding electrodes 41 and 42, of which the welding electrode 41 is of rod form and is introduced in the direction of the longitudinal axis of the transducer casing from above through the inside of the part 10, the bore 12 and the free internal space of the crystal arrangement 32 so that it is supported internally of the tubular spring on the bottom 14. The diaphragm 27—a thin circular metal plate—is held by means of the counter electrode 42 against the ring-like welding ridge 43 located at the under side of the bottom 14. Then the bottom 14 and the diaphragm are forced together by compressing the two electrodes and welded together by starting the welding current impulse.

Thereupon the diaphragm 27 is shaped as shown in FIG. 8. The mutually facing sides of the part 7 of the casing and the bottom 14 of the tubular spring are inclined at an angle α. This angle usually lies between 30° and 60° and the two bearing diameters d and D must be exactly controlled since they determine the pressure transmission ratio of the diaphragm 27 and thus, together with the average piezo modulus of the crystal arrangement, the sensitivity of the transducer. Then the welding of the diaphragm 27 with the lower side of the part 7, which is provided with a welding ridge 44 is effected (FIG. 7). For this purpose the diaphragm 27 is pressed by means of the welding electrodes 45 and 46 against the casing. The electrode 46 rests against the auxiliary flange 31. On starting the welding current impulse there is produced a tight welding of the diaphragm and the casing. For the further assembly of the transducer the insulator 20 with the contact spring 18 is inserted and the cap 21 shown in FIG. 1 is welded to the part 10 of the casing.

The transducer is hermetically sealed by welding against the measuring pressure space and against the surroundings. The transducer is characterized by extremely high operational reliability and can also be used under high vacuum or in radio-active media; in particular there are no resilient seals of synthetic material or the like which age or are adversely affected under radiation action.

The welding of the diaphragm with the tubular spring and with the casing of the transducer according to the invention can also be used with other constructions of transducers, one of which is shown in FIG. 9. In this case the casing is formed of two parts 51 and 52 which are screwed together. The casing part 52 engages by its ring-like portion 53 beneath the ring 54 of a tubular spring 55. The conditions are chosen so that, when screwing in the casing part 52 on to the threaded part 56, the tubular spring is expanded until the upper surface of the ring 54 rests on the surface 57. A connection of diaphragm and tubular spring before the application of the tubular spring is also impossible with this construction.

FIG. 9 further shows another embodiment of the crystal arrangement. Two ring-shaped crystals 58 and 59 are provided which enclose a central free space through which one electrode 62 can be introduced when welding the diaphragm 60 to the pressure plunger 61. The other electrode 63 is pressed as shown in FIG. 6 from beneath against the diaphragm 60. The further assembly is effected according to the previously described constructional example.

The invention is not limited to the embodiments described. Thus other piezo-electric crystals can also be used, for example those of barium titanate.

What I claim is:

1. A piezo electric transducer, a crystal arrangement, a cup-shaped tubular spring under axial precompression, said crystal arrangement being located in said cup-shaped tubular spring and resting at one of its ends against the bottom surface of the cup-shaped tubular spring, said transducer further including a casing for receiving the tubular spring and having an internal stationary shoulder, the crystal arrangement being characterized in that its remaining end engages directly against the internal stationary shoulder of the transducer casing and the tubular spring being provided with a welding flange at its open end which is welded under prestressing directly to the internal stationary shoulder of the transducer casing adjacent that portion engaged by the crystal arrangement.

2. A transducer according to claim 1, characterized in that the flange at the open end of the tubular spring is provided with a welding ridge, the height (h) of which is so determined that after the welding process the crystal arrangement shows the desired precompression.

3. Transducer according to claim 1 characterized in that the walls of the cup-shaped tubular spring and the walls of the casing are spaced-apart a predetermined distance to define a cavity, the cavity serving for the introduction of a welding electrode.

4. A transducer according to claim 3 characterized in that the casing is provided with an external shoulder surface standing transversely to the axis of the tubular spring and serving as abutment of a second welding electrode which acts as counter-electrode when welding the tubular spring to the casing.

5. A transducer according to claim 3, characterized in that the cavity between tubular spring and casing is sealed at the open end thereof by a diaphragm, which is connected to the bottom of both the tubular spring and a portion of the casing by welding.

6. A transducer according to claim 5, characterized in that the cup-shaped tubular spring and crystal arrangement are designed to provide a central opening and the casing includes means defining a central opening that is axially aligned with the first mentioned central opening whereby a welding electrode may be inserted through the axially aligned central openings and applied to the bottom of the cup-shaped tubular spring to coact with a further welding electrode pressed from the outside onto the diaphragm to thereby provide a ring ridge welding of the diaphragm to the bottom of the tubular spring.

7. A transducer according to claim 1 characterized in that between the piezo-electric crystal arrangement and the internal stationary shoulder of the casing a ceramic ring is provided, serving as an electric insulator and preventing the splashing of the welding material onto the crystal arrangement.

8. A transducer according to claim 1 characterized in that the piezo-electric crystal arrangement is disposed between ceramic distance rings disposed at each end thereof, the lengths and the co-efficients of expansion of the ceramic distance rings being chosen so, that the total assembly has the same co-efficient of expansion as the surrounding tubular spring.

9. A piezo-electric transducer according to claim 2 whereby the ring-welding ridge is spaced such distance (v) from the internal shoulder of the casing area by a portion of the crystal arrangement which extends longitudinally beyond the open end of the tube spring with the tube spring compressionless so that the desired compression will be attained by the expansion (v+h) of the tube spring as the result of the welding operation.

References Cited

UNITED STATES PATENTS

| | | | |
|---|---|---|---|
| 2,454,264 | 11/1948 | Stiger | 310—8.7 |
| 2,703,848 | 3/1955 | Kistler | 310—8.7 |
| 2,842,686 | 7/1958 | Musser | 310—8.7 |
| 2,846,496 | 8/1958 | Baumgartner | 310—8.7 |
| 2,863,076 | 12/1958 | Koren | 310—8.6 |
| 3,171,989 | 3/1965 | Hatscher | 310—8.7 |

MILTON O. HIRSHFIELD, Primary Examiner.

J. D. MILLER, Assistant Examiner.